(12) United States Patent
He (10) Patent No.: US 11,071,147 B2
(45) Date of Patent: Jul. 20, 2021

(54) BACKOFF PROCEDURE IN RANDOM ACCESS

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/534,799

(22) Filed: Aug. 7, 2019

(65) Prior Publication Data

US 2020/0053794 A1  Feb. 13, 2020

Related U.S. Application Data

(60) Provisional application No. 62/716,244, filed on Aug. 8, 2018.

(51) Int. Cl.
*H04L 12/28* (2006.01)
*H04W 74/08* (2009.01)
(Continued)

(52) U.S. Cl.
CPC ... *H04W 74/0833* (2013.01); *H04W 72/0446* (2013.01); *H04W 72/1205* (2013.01); *H04W 74/006* (2013.01); *H04W 74/02* (2013.01)

(58) Field of Classification Search
CPC .......... H04W 74/0833; H04W 74/008
(Continued)

(56) References Cited

U.S. PATENT DOCUMENTS

| 10,736,147 B2* | 8/2020 | Jung | H04W 74/0833 |
| 2012/0076126 A1* | 3/2012 | Yi | H04W 74/085 |
| | | | 370/338 |

(Continued)

FOREIGN PATENT DOCUMENTS

WO  2019145876 A1  8/2019

OTHER PUBLICATIONS

3GPP TS 36.321: "3rd Generation Partnership Project; Technical Specification Group Radio Access Network; Evolved Universal Terrestrial Radio Access (E-UTRA); Medium Access Control (MAC) Protocol Specification (Release 15)", 3GPP Standard; Technical Specification; 3rd Generation Partnership Project (3GPP), Mobile Competence Centre ; 650, Route Des Lucioles; F-06921 Sophia-Antipolis Cedex; France, vol. RAN WG2, No. V15.2.0, Jul. 6, 2018 (Jul. 6, 2018), 127 Pages, XP051474829, [retrieved on Jul. 6, 2018], section 1 "Scope", section 5.1 "Random Access procedure".

(Continued)

*Primary Examiner* — John Pezzlo
(74) *Attorney, Agent, or Firm* — Changwoo Yang (57) ABSTRACT

Certain aspects of the present disclosure provide techniques for a random backoff procedure in a wireless communication network such as a new radio (NR) network. A method for wireless communications that can be performed by a user equipment (UE) is provided. The method includes sending a random access preamble to a base station (BS) during a random access procedure. The method includes receiving a random access response from the BS including a backoff indicator. The method includes determining whether to send a contention-free random access (CFRA) preamble to the BS during the backoff period based, at least in part, on a type of the random access procedure.

20 Claims, 7 Drawing Sheets

(51) Int. Cl.
H04W 74/00 (2009.01)
H04W 72/12 (2009.01)
H04W 72/04 (2009.01)
H04W 74/02 (2009.01)
H04J 1/16 (2006.01)

(58) Field of Classification Search
USPC .......................................... 370/252, 329, 445
See application file for complete search history.

(56) References Cited

U.S. PATENT DOCUMENTS

| | | | |
|---|---|---|---|
| 2019/0053271 A1* | 2/2019 | Islam | H04W 74/0833 |
| 2019/0261411 A1* | 8/2019 | Chin | H04W 74/0833 |
| 2020/0221506 A1* | 7/2020 | Jeon | H04W 74/0833 |

OTHER PUBLICATIONS

Huawei et al., "Further Discussion on Beam Reselection in RACH Procedure", 3GPP Draft; R2-1810581 Further Discussion On Beam Reselection In RACH Procedure, 3RD Generation Partnership Project (3GPP), Mobile Competence Centre ; 650, Route Des Lucioles ; F-06921 Sophia-Antipolis, vol. RAN WG2, No. Montreal. Canada; Jul. 2, 2018-Jul. 6, 2018, Jul. 1, 2018 (Jul. 1, 2018), XP051467732, 3 Pages, Retrieved from the Internet: URL:http://www.3gpp.org/ftp/Meetings%5F3GPP%5FSYNC/RAN2/Docs [retrieved on Jul. 1, 2018].

International Search Report and Written Opinion—PCT/US2019/045688—ISA/EPO—Oct. 30, 2019.

Samsung Electronics: "Corrections for Random Access Backoff", 3GPP Draft; R2-1809471—Corrections For Random Access Backoff, 3RD Generation Partnership Project (3GPP), Mobile Competence Centre, 650, Route Des Lucioles, F-06921 Sophia-Antipolis Cedex, France, vol. RAN WG2, No. Montreal, Canada; Jul. 2, 2018—Jul. 6, 2018, Jun. 21, 2018 (Jun. 21, 2018), XP051525331, 6 Pages, Retrieved from the Internet: URL:http://www.3gpp.org/ftp/tsg%5Fran/WG2%5FRL2/TSGR2%5FAHs/2018%5F07%5FNR/Docs/R2%2D1809471%2Ezip [retrieved on Jun. 21, 2018].

Vice Chairman (Mediatek): "Report Breakout Session UP, IAB, NR-U", 3GPP Draft; R2-1810775 RAN2-NR-AH1807-UPIABNRU BREAKOUTSESSION-EOM, 3RD Generation Partnership Project (3GPP), Mobile Competence Centre; 650, Route Des Lucioles; F-06921, Sophia-Antipolis Cedex ; Fra, vol. RAN WG2, No. Montreal, Canada; Jul. 2, 2018-Jul. 6, 2018, Jul. 8, 2018 (Jul. 8, 2018), XP051526532, 56 Pages, Retrieved from the Internet: URL:http://www.3gpp.org/ftp/tsg%5Fran/WG2%5FRL2/TSGR2%5FAHs/2018%5F07%5FNR/Docs/R2%2D1810775%2Ezip [retrieved on Jul. 8, 2018], section "Backoff"; p. 15.

* cited by examiner

BACKOFF PROCEDURE IN RANDOM ACCESS

CROSS-REFERENCE TO RELATED APPLICATION(S)

This application claims benefit of and priority to U.S. Provisional Patent Application Ser. No. 62/716,244, filed Aug. 8, 2018, herein incorporated by reference in its entirety as if fully set forth below and for all applicable purposes.

BACKGROUND

Field of the Disclosure

Aspects of the present disclosure relate to wireless communications, and more particularly, to techniques for a backoff procedure in random access.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method includes sending a random access preamble to a base station (BS) during a random access procedure. The method includes receiving a random access response from the BS including a backoff indicator. The method includes determining whether to send a contention-free random access (CFRA) preamble to the BS during a backoff period based, at least in part, on a type of the random access procedure.

Certain aspects provide a method for wireless communication by a BS. The method includes receiving a random access preamble from a UE during a random access procedure. The method includes sending a random access response to the UE including a backoff indicator. The method includes receiving a CFRA preamble from the UE during a backoff period.

Certain aspects provide an apparatus for wireless communication, such as a UE. The apparatus includes means for sending a random access preamble to a BS during a random access procedure. The apparatus includes means for receiving a random access response from the BS including a backoff indicator. The apparatus includes means for determining whether to send a CFRA preamble to the BS during a backoff period based, at least in part, on a type of the random access procedure.

Certain aspects provide an apparatus for wireless communication, such as a BS. The apparatus includes means for receiving a random access preamble from a UE during a random access procedure. The apparatus includes means for sending a random access response to the UE including a backoff indicator. The apparatus includes means for receiving a CFRA preamble from the UE during a backoff period.

Certain aspects provide an apparatus for wireless communication, such as a UE. The apparatus includes a memory. The apparatus includes at least one processor coupled with the memory and configured to send a random access preamble to a BS during a random access procedure; receive a random access response from the BS including a backoff indicator; and determine whether to send a CFRA preamble to the BS during a backoff period based, at least in part, on a type of the random access procedure.

Certain aspects provide an apparatus for wireless communication, such as a BS. The apparatus includes a memory. The apparatus includes at least one processor coupled with the memory and configured to receive a random access preamble from a UE during a random access procedure; send a random access response to the UE including a backoff indicator; and receive a CFRA preamble from the UE during a backoff period.

Certain aspects provide a computer readable medium having computer executable code stored thereon for wireless communication by a UE. The computer readable medium includes code for sending a random access preamble to a BS during a random access procedure. The computer readable medium includes code for receiving a random access response from the BS including a backoff indicator. The computer readable medium includes code for determining whether to send a CFRA preamble to the BS during a backoff period based, at least in part, on a type of the random access procedure.

Certain aspects provide a computer readable medium having computer executable code stored thereon for wireless communication by a BS. The computer readable medium includes code for receiving a random access preamble from a UE during a random access procedure. The computer readable medium includes code for sending a random access response to the UE including a backoff indicator. The computer readable medium includes code for receiving a CFRA preamble from the UE during a backoff period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for a backoff procedure in random access. In certain systems, for example such as new radio systems (e.g., 5G NR), a random access procedure is provided with contention free resources allowing a user equipment (UE) to transmit a contention free random access (CFRA) preamble. One example of a random access procedure is described in IEEE technical specification 38.321. If the random access procedure is provided with contention free resources, the UE measures reference signals from a base station (BS), such as next generation Node B (gNB) in NR, to determine the signal quality (e.g., the reference signal receive power (RSRP)). If the signal quality is sufficient, the UE sends a CFRA preamble; otherwise, the UE falls back to contention-base random access (CBRA). The BS may send the UE a backoff indication.

Aspects of the present disclosure relate to whether the UE performs backoff when the UE has contention free resources.

The following description provides examples of backoff procedures in random access, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

Figure 1:
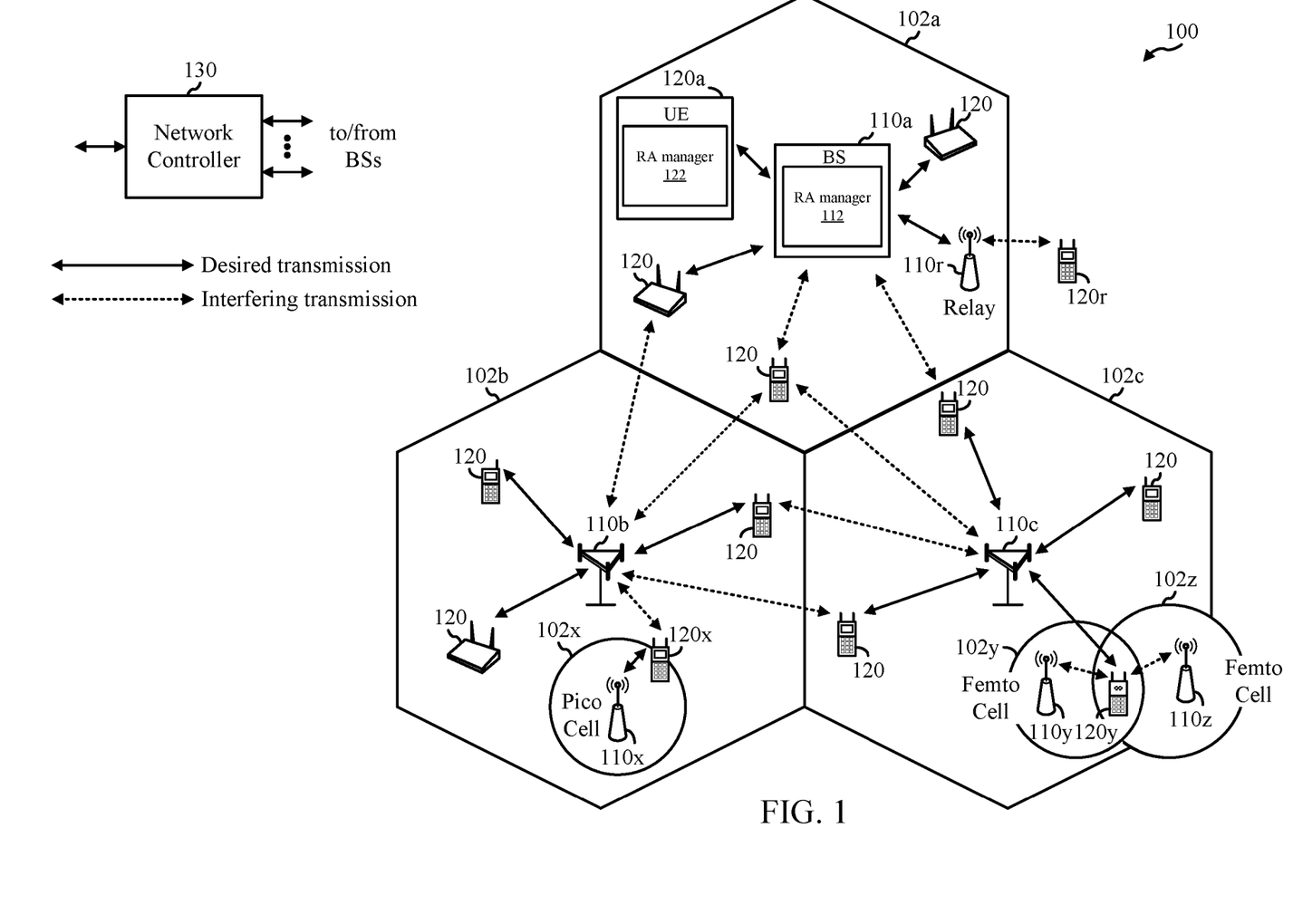
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be a New Radio (NR) or 5G network. A UE 120 in the wireless communication network 100 may send a random access preamble to a BS 110 in the wireless communication network 100 during a random access procedure. The BS 110 receives the random access preamble and sends the UE 120 a random access response including a backoff indicator. The UE 120 receives the random access response including the backoff indicator and may determine whether to send a contention-free random access (CFRA) preamble based on a type of the random access procedure.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may perform a random access procedure. As shown in FIG. 1, the BS 110a includes a random access manager 112. The random access manager 112 may be configured to receive a random access preamble from UE 120a during a random access procedure; send a random access response to the UE 120a including a backoff indicator; and receive a CFRA preamble from the UE 120a during the backoff period, in accordance with aspects of the present disclosure. As shown in FIG. 1, the UE 120a includes a random access manager 122. The random access manager 122 may be configured to send a random access preamble to BS 110a during a random access procedure; receive a random access response from the BS including a backoff indicator; and determine whether to send a CFRA preamble to the BS 110a during the backoff period based, at least in part, on a type of the random access procedure, in accordance with aspects of the present disclosure.

Wireless communication network 100 may also include relay stations (e.g., relay station 110r), also referred to as relays or the link, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120. A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

As mentioned above, aspects of the present disclosure relate to backoff during random access. A random access procedure may include one or more attempts by a UE (e.g., a UE 120) to send a random access preamble to a BS (e.g., a BS 110). In certain systems (e.g., 5G NR), a random access procedure may be contention-free or contention-based. In some examples, if the UE is provided with CFRA resources, then the UE initiates a CFRA procedure. That is, the random access procedure is initiated with dedicated preambles (or dedicated PRACH resources). Or, in some cases, the UE may initiate a CBRA procedure and may later be provided the CFRA resources during the CBRA. In this case, the UE may switch to, or initiate, the CFRA procedure. In some examples, the CFRA resources may be provided explicitly by radio resource control (RRC) signaling.

In the CFRA procedure, the UE determines whether to attempt to transmit a CFRA preamble. The UE measures reference signals from the BS (e.g., a next generation Node B (gNB) in NR) to determine the signal quality (e.g., such as the reference signal beam strength). In some examples, the UE measures the synchronization signal block (SSB) and/or the channel state information reference signal (CSI-RS) from the BS. In some examples, the UE measures the reference signal receive power (RSRP) of the one or more RSs. If the signal quality is good enough, the UE sends a CFRA preamble; otherwise, the UE falls back to CBRA. For example, the UE may compare the RSRP of the configured RSs (e.g., the rsrp-ThresholdSSB may be the threshold for a measured SSB or the rsrp-ThresholdCSI-RS may be the threshold for a measured CSI-RS) to a threshold. If at least one of the RSs has a measured RSRP above the threshold, the UE determines to attempt to transmit a CFRA preamble. Alternatively, if none of the RSs has a measured RSRP above the threshold, the UE determines to attempt to transmit a CBRA preamble.

The UE may select the preamble, and the beam for the preamble, based on the measured RS. In some examples, the measured RS includes an indication of the preamble (e.g., a ra-PreambleIndex in the RS may indicate the random access preamble). In some examples, the preamble is signaled via RRC or a physical downlink control channel (PDCCH) from the BS. In some examples, the UE attempts to transmit the preamble in a PRACH occasion associated with the measured reference signal (e.g., by the ra-ssb-OccasionMaskIndex associated with the measured SSB or the ra-OccasionList associated with the measured CSI-RS).

In some cases, the BS may miss the transmitted random access preamble. In some examples, the UE may determine a time window to monitor for a random access response (RAR) from the BS (e.g., the ra-ResponseWindow). The UE can monitor the PDCCH for the RAR from the BS during the time window. The UE may receive a RAR that contains a backoff indicator from the BS that requests backoff. For example, the RAR message may include a medium access control (MAC) subheader (e.g., a subPDU) and the backoff indicator may be indicated by a value of a field (e.g., the BI field) in the MAC subheader. The UE may determine the backoff duration based on a value of the field and a scaling factor from a table.

For a CBRA procedure, when the BS request backoff, the UE starts a backoff timer (e.g., according to the determined backoff duration) and does not send any preamble before expiry of the backoff period. However, if the UE has contention free resources configured, it may desirable for the UE to still be able transmit a CFRA preamble.

Accordingly, aspects of the present disclosure provide a backoff procedure for random access, in which the UE can still attempt to send a CFRA preamble during a backoff period if the random access procedure was initiated as a CFRA, and if the signal is good enough; otherwise, if the random procedure was initiated as a CBRA, the UE waits for expiry of the backoff period before it attempts to send any random access preamble.

Example Backoff Procedure In Random Access

Figure 2:
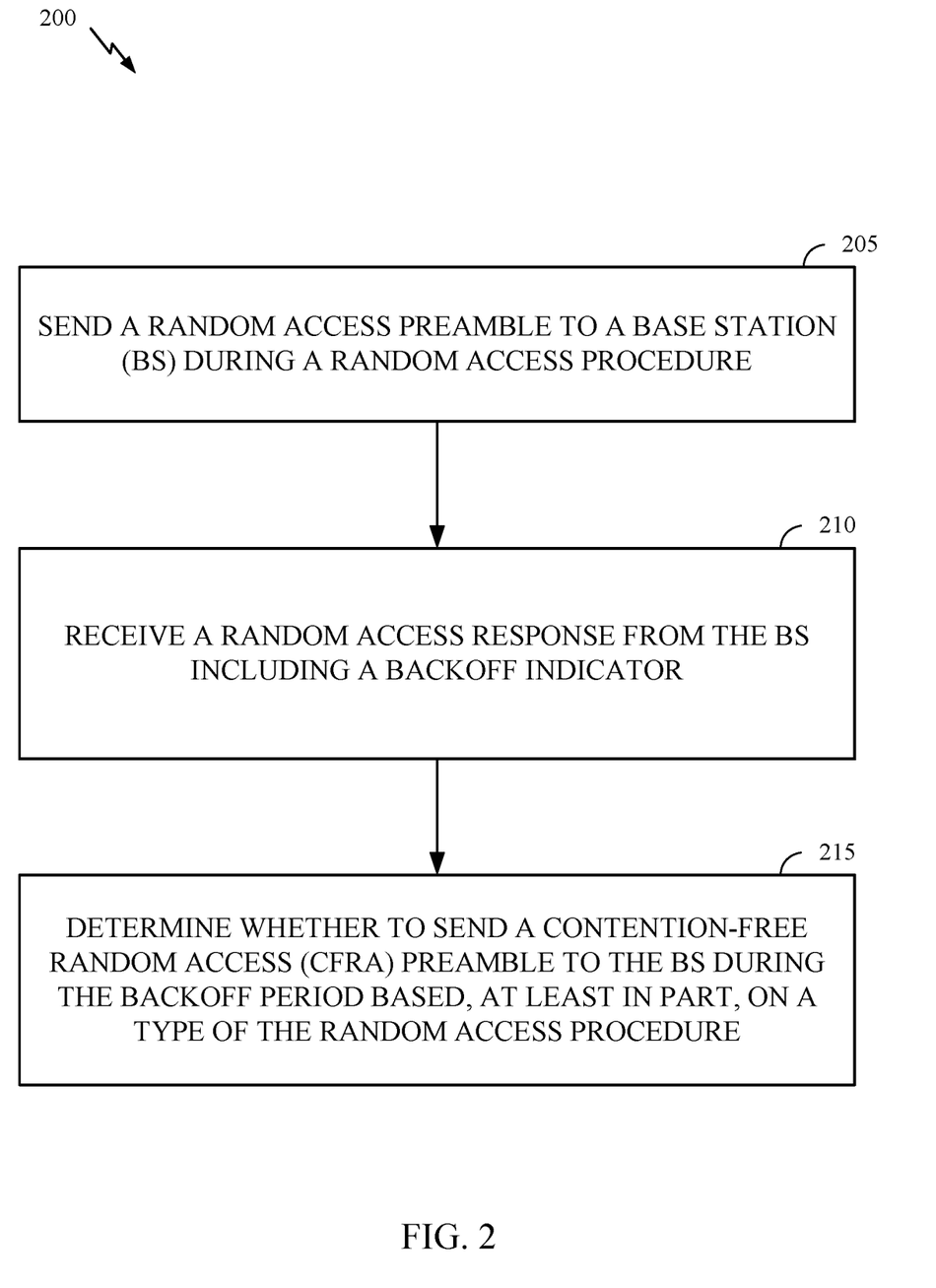
FIG. 2 is a flow diagram illustrating example operations for wireless communication by a user equipment (UE), in accordance with certain aspects of the present disclosure.

FIG. 2 is a flow diagram illustrating example operations 200 for wireless communication, in accordance with certain aspects of the present disclosure. The operations 200 may be performed, for example, by a UE (e.g., such as the UE 120a in the wireless communication network 100). Operations 200 may be implemented as software components that are executed and run on one or more processors (e.g., controller/processor 780 of FIG. 7). Further, the transmission and reception of signals by the UE in operations 700 may be enabled, for example, by one or more antennas (e.g., antennas 752 of FIG. 7). In certain aspects, the transmission and/or reception of signals by the UE may be implemented via a bus interface of one or more processors (e.g., controller/processor 780) obtaining and/or outputting signals.

The operations 200 may begin, at 205, by sending a random access preamble to a BS during a random access procedure.

At 210, the UE receives a RAR from the BS including a backoff indicator.

At 215, the UE determines whether to send a CFRA preamble to the BS during a backoff period based, at least in part, on a type of the random access procedure. For example, the UE determines a signal quality (e.g., RSRP) of one or more reference signals (e.g., SSB and/or CSI-RS) from the BS if the random access procedure was initiated as a CFRA procedure. In some examples, the UE may determine the signal quality by looking up a most recent measured signal quality or by waiting and measuring the RS. The UE may look up the signal quality or wait and measure the RS based on a time until the RS will be sent. For example, if the time will be long (e.g., exceeding a threshold) the UE looks up the most recent measured signal quality and if the time will be short (e.g., does not exceed the threshold), then the UE waits for the next RS and measures the signal quality. The UE can compare the determined signal quality to a threshold and determine whether to send the CFRA preamble to the BS during the backoff period based on the comparison. For example, the UE determines to send the CFRA preamble if at least one of the RSs has an RSRP above the threshold. On the other hand, the UE determines to wait for a next reference signal or expiry of the backoff period if the determined signal quality does not satisfy the threshold. If random access procedure was initiated as a CBRA procedure, the UE waits for expiry of the backoff period (e.g., regardless of signal quality).

Figure 3:
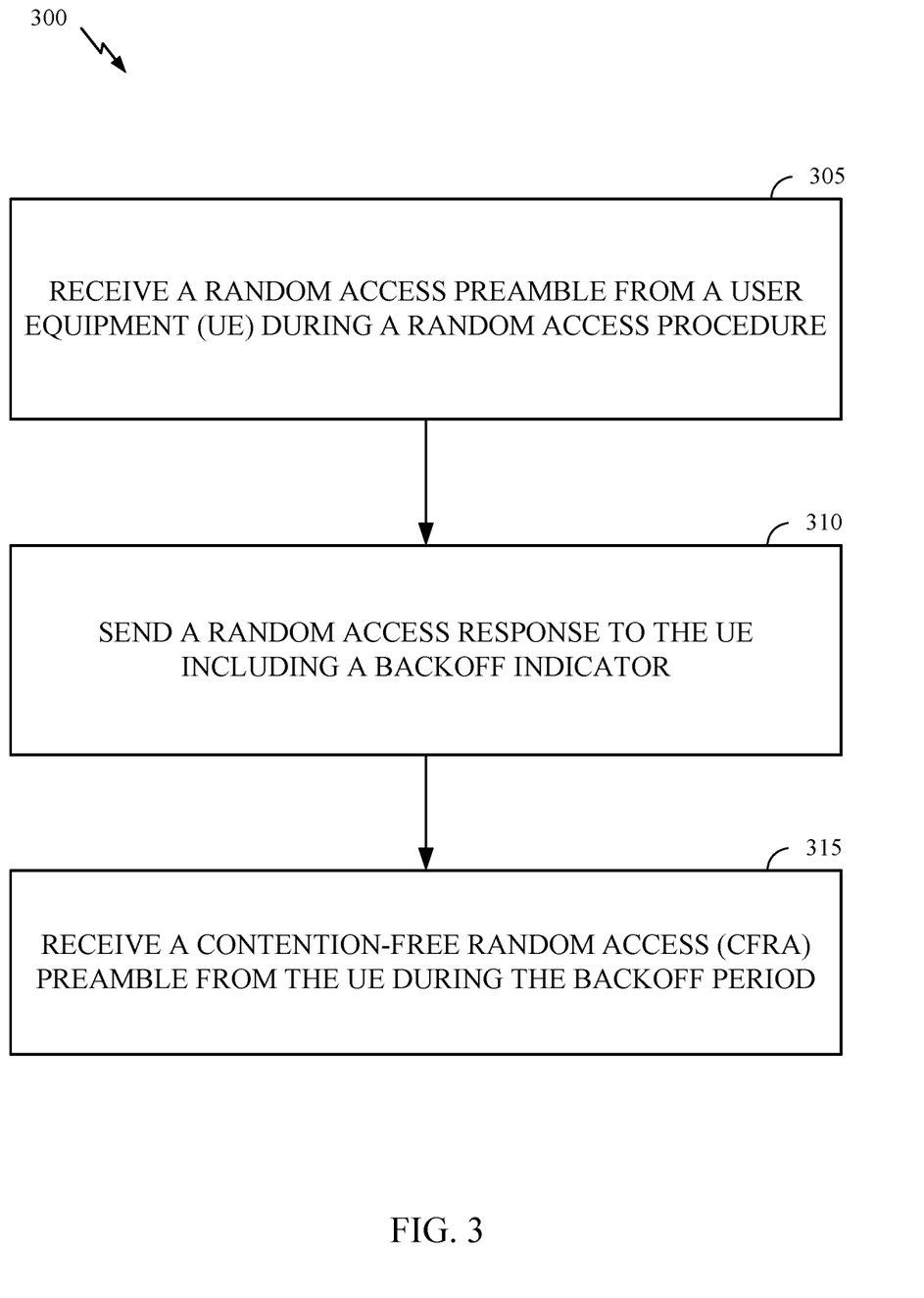
FIG. 3 is a flow diagram illustrating example operations for wireless communication by a base station (BS), in accordance with certain aspects of the present disclosure.

FIG. 3 is a flow diagram illustrating example operations 300 for wireless communication, in accordance with certain aspects of the present disclosure. The operations 300 may be performed, for example, by a BS (e.g., such as the BS 110a in the wireless communication network 100). The operations 300 may be complementary operations by the BS to the operations 200 performed by the UE. Operations 300 may be implemented as software components that are executed and run on one or more processors (e.g., controller/processor 740 of FIG. 7). Further, the transmission and reception of signals by the BS in operations 300 may be enabled, for example, by one or more antennas (e.g., antennas 734 of FIG. 7). In certain aspects, the transmission and/or reception of signals by the BS may be implemented via a bus interface of one or more processors (e.g., controller/processor 740) obtaining and/or outputting signals.

The operations 300 may begin, at 305, by receiving a random access preamble from a UE during a random access procedure (e.g., a CFRA procedure). In some examples, before receiving the random access preamble, the BS provides CFRA resources for the random access procedure. In some examples, before receiving the random access preamble, the BS sends one or more reference signals (e.g., SSBs and/or CSI-RSs) to the UE.

At 310, the BS sends a RAR to the UE including a backoff indicator.

At 315, the BS receives a CFRA preamble from the UE during a backoff period.

Figure 4:
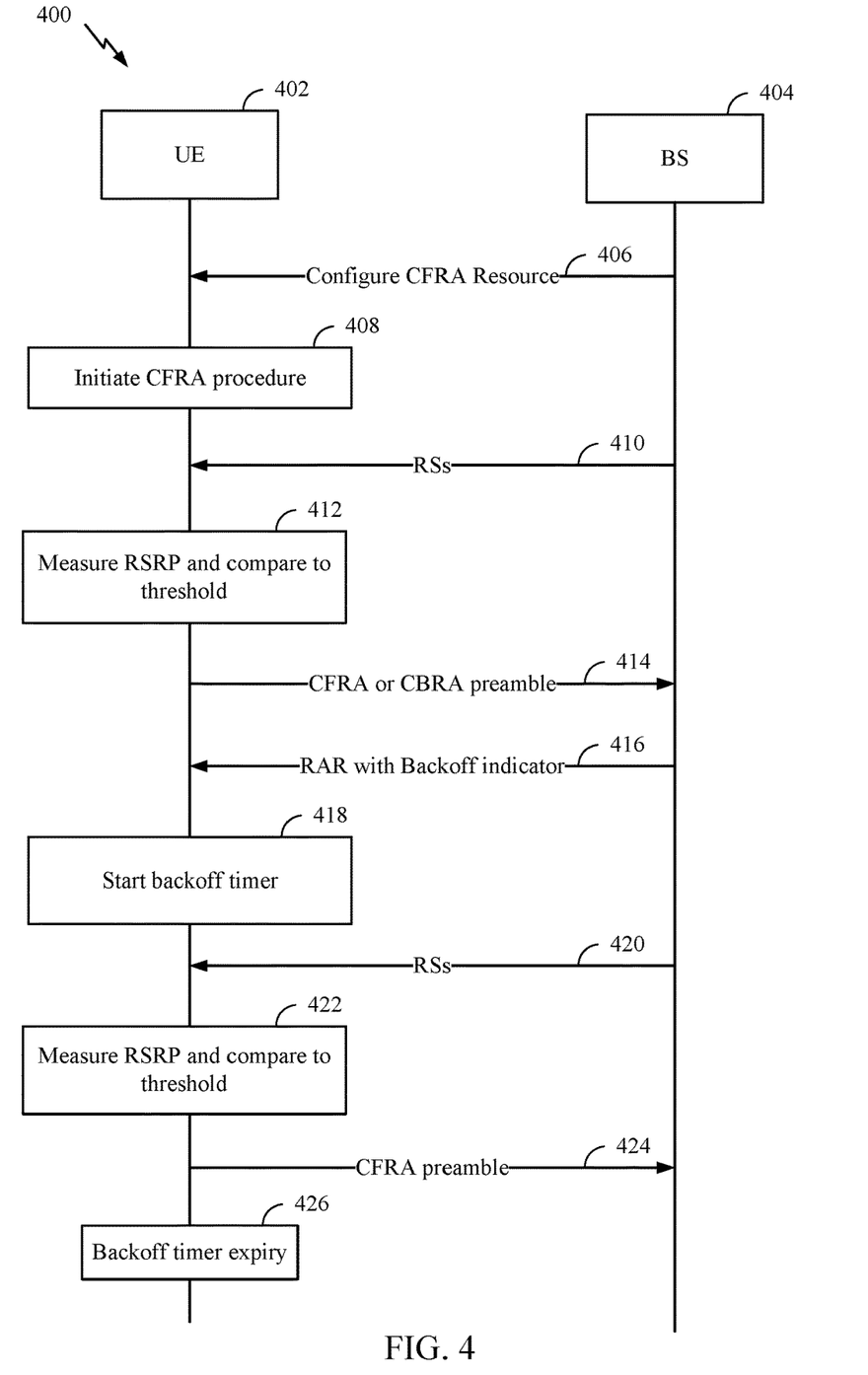
FIG. 4 is a call flow diagram illustrating example signaling between a UE and BS for a backoff procedure, in accordance with certain aspects of the present disclosure.

FIG. 4 is a call flow 400 illustrating example signaling between a UE 402 and a BS 404 for an example backoff procedure, in accordance with certain aspects of the present disclosure. As shown in FIG. 4, at 406, the BS 404 provides the UE 402 with CFRA resources. Thus, at 408, the UE 402 can initiate the random access procedure as contention-free. At 410, the BS 404 sends the UE 402 one or more RSs (e.g., SSB and/or CSI-RS). At 412, the UE 402 measures the RSRP and compares it to a threshold. At 414, the UE 402 sends a CFRA preamble or CBRA preamble to the BS 404 based on the comparison. For example, if the RSRP satisfies the threshold at 412, the UE 402 sends the CFRA preamble at 414; and if the RSRP does not satisfy the threshold at 412, the UE 402 sends the CBRA preamble at 414. At 416, the BE 404 sends the UE 402 a RAR message with a backoff indicator. At 418, after the UE 402 receives the backoff indicator, the UE 402 starts the backoff timer. At 420, the UE 402 receives one or more RSs from the BS 404. Because the random access procedure was initiated at contention-free, at 408, the UE 402 measures the RSRP and compares it to a threshold at 422, regardless whether the preamble sent at 414 was a CFRA or CBRA preamble. At 424, the UE 402 sends a CFRA preamble, before expiry of the backoff timer at 426, if the RSRP satisfies the threshold at 422.

Figure 5:
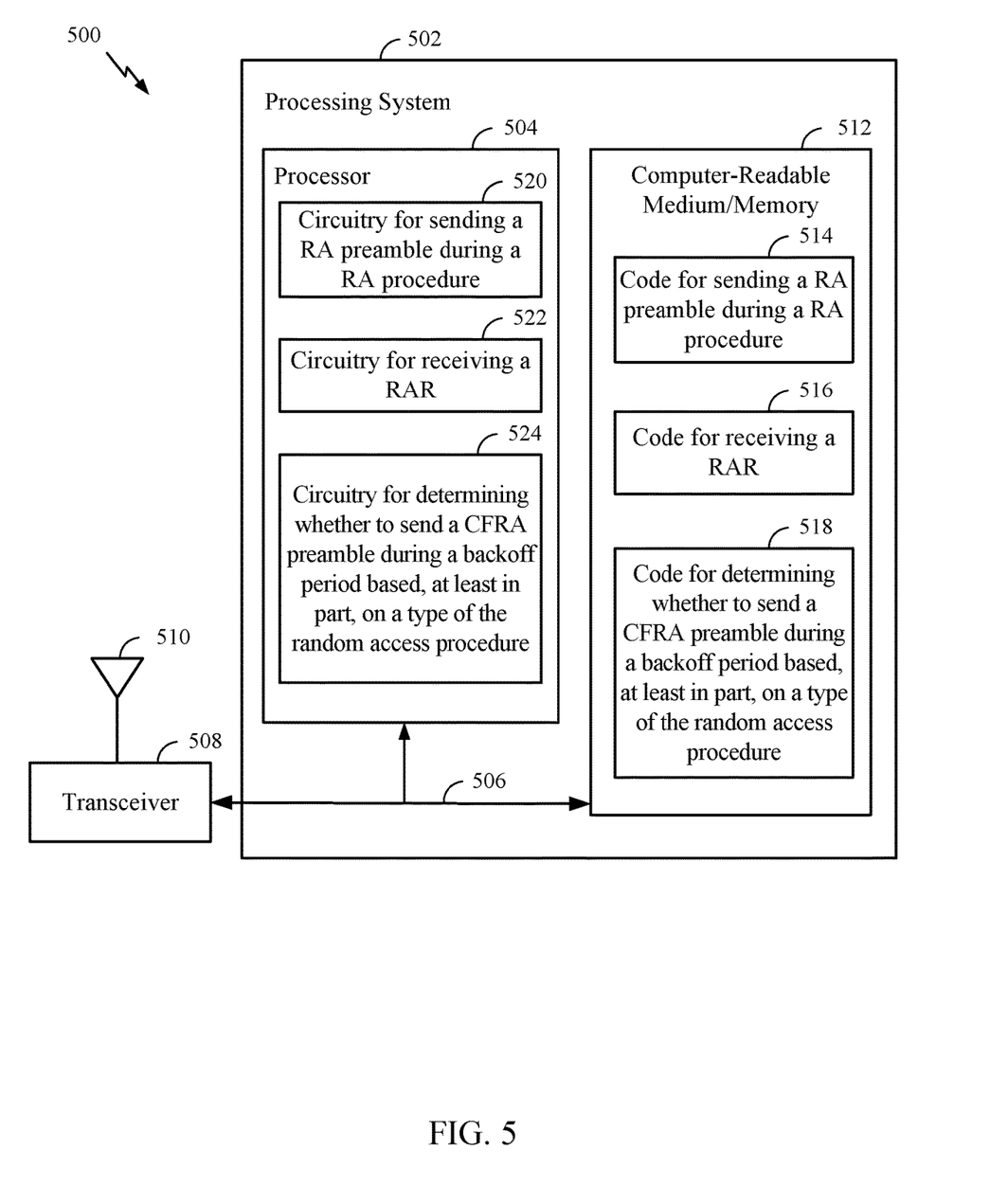
FIG. 5 illustrates a communications device that may include various components configured to perform operations for the techniques disclosed herein in accordance with aspects of the present disclosure.

FIG. 5 illustrates a communications device 500 that may include various components (e.g., corresponding to means-plus-function components) configured to perform operations for the techniques disclosed herein for a backoff procedure during random access, such as the operations illustrated in FIG. 2. The communications device 500 includes a processing system 502 coupled to a transceiver 508. The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/ memory 512 is configured to store instructions (e.g., computer executable code) that when executed by the processor 504, cause the processor 504 to perform the operations illustrated in FIG. 2, or other operations for performing the various techniques discussed herein for a backoff procedure in random access. In certain aspects, computer-readable medium/memory 512 stores code 514 for sending random access preamble to a BS during a random access procedure; code 516 for receiving a RAR from the BS including a backoff indicator; and code 518 for determining whether to send a CFRA preamble during a backoff period based, at least in part, on a type of the random access procedure. In certain aspects, the processor 504 has circuitry configured to implement the code stored in the computer-readable medium/memory 512. The processor 504 includes circuitry 520 for sending a random access preamble to a BS during a random access procedure; circuitry 522 for receiving a RAR from the BS including a backoff indicator; and circuitry 524 for determining whether to send a CFRA preamble during a backoff period based, at least in part, on a type of the random access procedure. The transceiver 508 may be configured to send a RA preamble and to receive a RAR including a backoff indicator.

Figure 6:
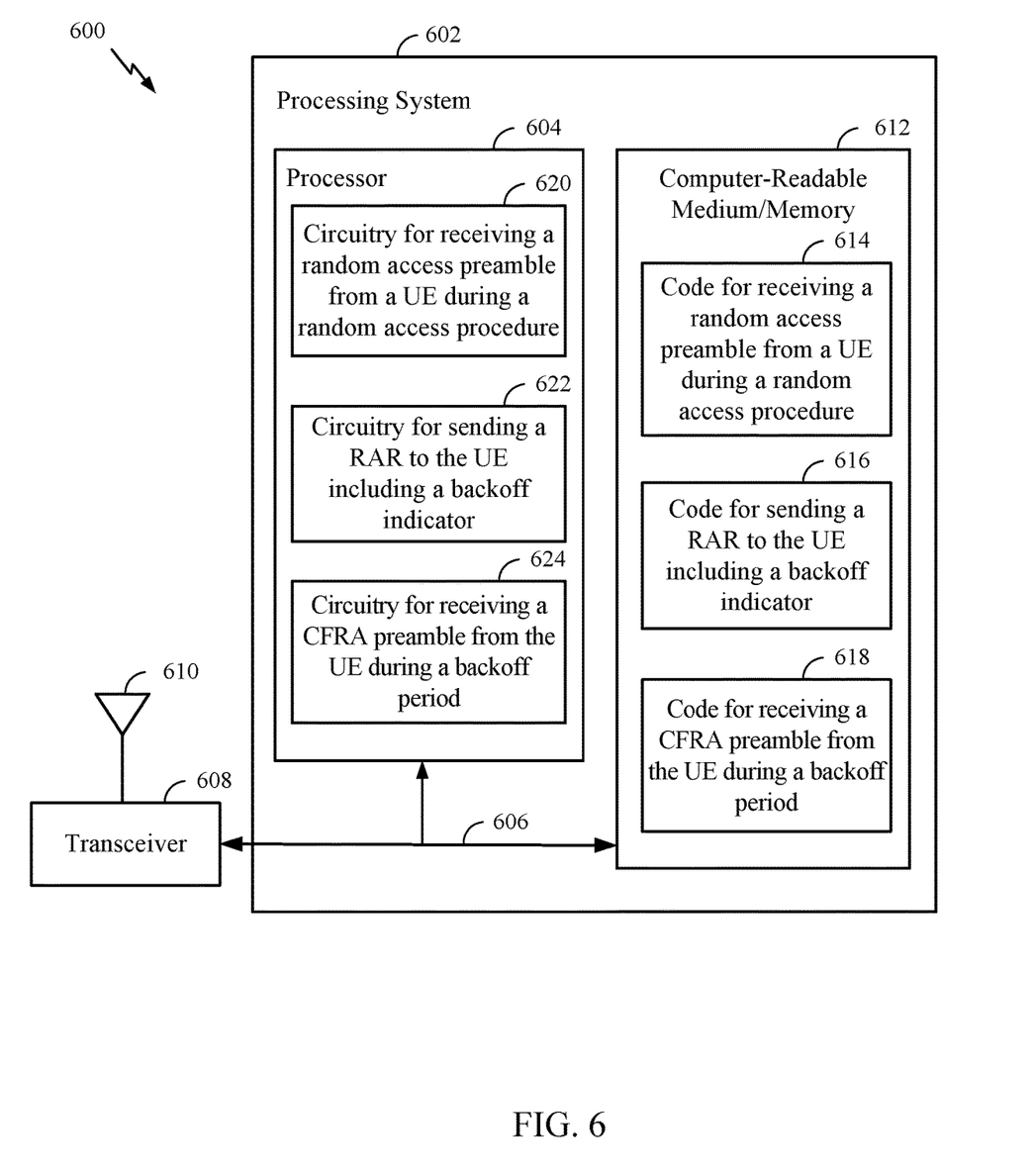
FIG. 6 illustrates another communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 3. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer executable code) that when executed by the processor 604, cause the processor 604 to perform the operations illustrated in FIG. 3, or other operations for performing the various techniques discussed herein for a backoff procedure for random access. In certain aspects, computer-readable medium/memory 612 stores code 614 for receiving a random access preamble from a UE during a random access procedure; code 616 for sending a RAR to the UE including a backoff indicator; and code 1118 for receiving a CFRA preamble from the UE during a backoff period. In certain aspects, the processor 1104 has circuitry configured to implement the code stored in the computer-readable medium/memory 1112. The processor 604 includes circuitry 620 for receiving a random access preamble from a UE during a random access procedure; circuitry 622 for sending a RAR to the UE including a backoff indicator; and circuitry 624 for receiving a CFRA preamble from the UE during a backoff period. The transceiver 1108 may be configured to receive a random access preamble; send a RAR including a backoff indicator; and receive a CFRA preamble during a backoff period.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Figure 7:
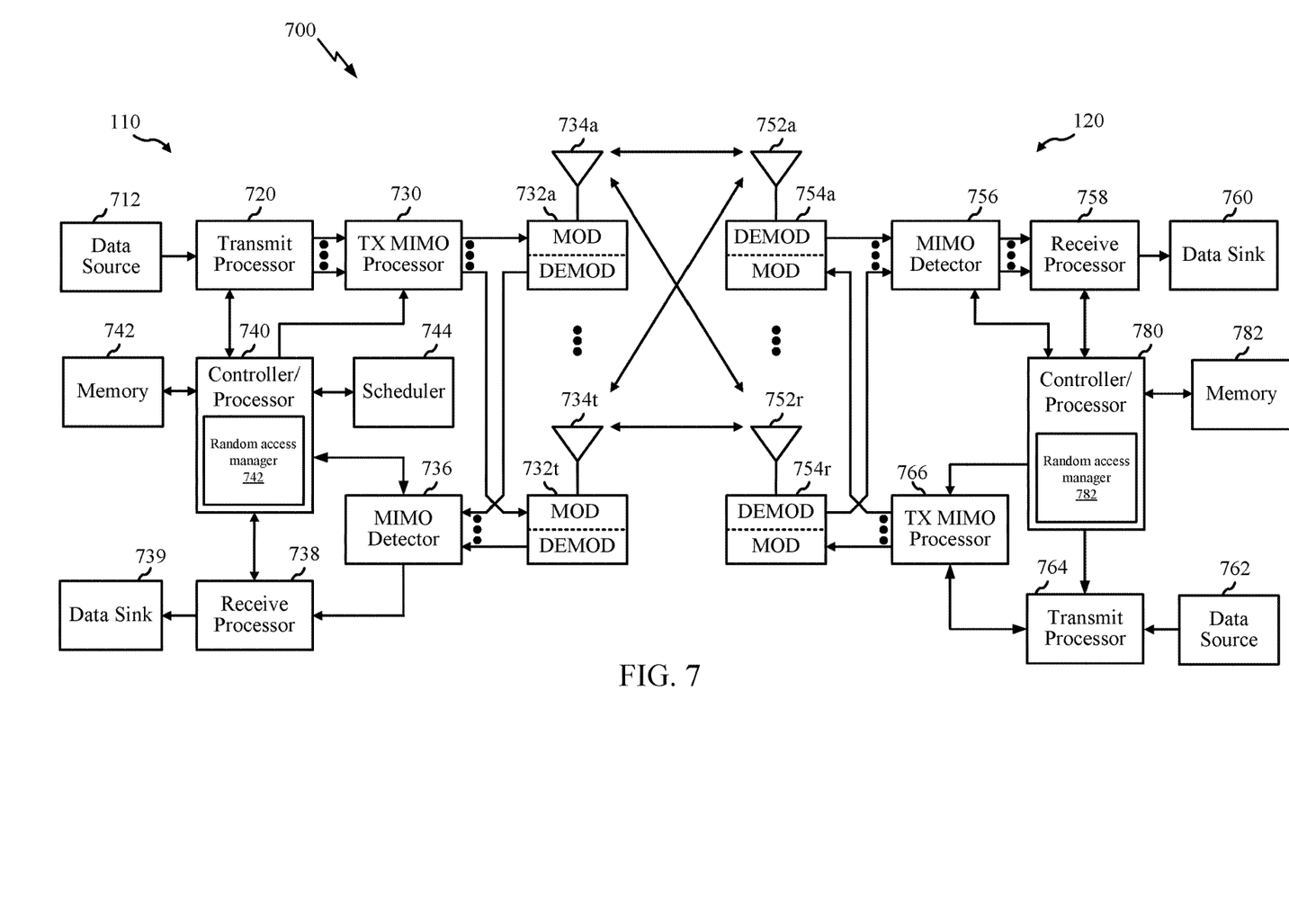
FIG. 7 is a block diagram conceptually illustrating a design of an example BS and UE, in accordance with certain aspects of the present disclosure.

FIG. 7 illustrates example components of BS 110*a* and UE 120*a* (as depicted in FIG. 1), which may be used to implement aspects of the present disclosure.

At the BS 110*a*, a transmit processor 720 may receive data from a data source 712 and control information from a controller/processor 740. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 720 may process (e.g., encode and symbol map) the data and control information to obtain data symbols and control symbols, respectively. The processor 720 may also generate reference symbols, e.g., for the primary synchronization signal (PSS), secondary synchronization signal (SSS), and cell-specific reference signal (CRS). A transmit (TX) multiple-input multiple-output (MIMO) processor 730 may perform spatial processing (e.g., precoding) on the data symbols, the control symbols, and/or the reference symbols, if applicable, and may provide output symbol streams to the modulators (MODs) 732*a* through 732*t*. Each modulator 732 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 732*a* through 732*t* may be transmitted via the antennas 734*a* through 734*t*, respectively.

At the UE 120*a*, the antennas 752*a* through 752*r* may receive the downlink signals from the BS 110*a* and may provide received signals to the demodulators (DEMODs) in transceivers 754*a* through 754*r*, respectively. Each demodulator 754 may condition (e.g., filter, amplify, downconvert, and digitize) a respective received signal to obtain input samples. Each demodulator may further process the input samples (e.g., for OFDM, etc.) to obtain received symbols. A MIMO detector 756 may obtain received symbols from all the demodulators 754*a* through 754*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 760, and provide decoded control information to a controller/processor 780.

On the uplink, at UE 120*a*, a transmit processor 764 may receive and process data (e.g., for the physical uplink shared channel (PUSCH)) from a data source 762 and control information (e.g., for the physical uplink control channel (PUCCH) from the controller/processor 780. The transmit processor 764 may also generate reference symbols for a reference signal (e.g., for the sounding reference signal (SRS)). The symbols from the transmit processor 764 may be precoded by a TX MIMO processor 766 if applicable, further processed by the demodulators in transceivers 754*a* through 754*r* (e.g., for SC-FDM, etc.), and transmitted to the BS 110*a*. At the BS 110*a*, the uplink signals from the UE 120*a* may be received by the antennas 734, processed by the modulators 732, detected by a MIMO detector 736 if applicable, and further processed by a receive processor 738 to obtain decoded data and control information sent by the UE 120*a*. The receive processor 738 may provide the decoded data to a data sink 739 and the decoded control information to the controller/processor 740.

The controllers/processors 740 and 780 may direct the operation at the BS 110*a* and the UE 120*a*, respectively. The processor 740 and/or other processors and modules at the BS 110*a* may perform or direct the execution of processes for the techniques described herein. The memories 742 and 782 may store data and program codes for BS 110*a* and UE 120*a*, respectively. A scheduler 744 may schedule UEs for data transmission on the downlink and/or uplink.

As shown in FIG. 7, the controller/processor 740 of the BS 110*a* has a random access manager 741 that may be configured to receive a random access preamble from UE 120*a* during a random access procedure; send a random access response to the UE 120*a* including a backoff indicator; and receive a CFRA preamble from the UE 120*a* during the backoff period, in accordance with aspects of the present disclosure. As shown in FIG. 7, the controller/processor 780 of the UE 120*a* has a random access manager 741 that may be configured to send a random access preamble to BS 110*a* during a random access procedure; receive a random access response from the BS including a backoff indicator; and determine whether to send a CFRA preamble to the BS 110*a* during the backoff period based, at least in part, on a type of the random access procedure, in accordance with aspects of the present disclosure. Although shown at the Controller/Processor, other components of the UE 120*a* and BS 110*a* may be used to perform the operations described herein.

In an LTE or LTE-A network, a set of one or more B Ss may define an eNodeB (eNB). In other examples (e.g., in a 5G NR network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, gNB or gNodeB, transmission reception point (TRP), etc.). A BS or DU may communicate with a set of UEs on downlink channels (e.g., for transmissions from a BS or DU to a UE) and uplink channels (e.g., for transmissions from a UE to BS or DU).

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 2 and FIG. 3.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
 sending a first random access preamble to a base station (BS) during a first random access procedure;

receiving a random access response from the BS including a backoff indicator; and
determining whether to send a second random access preamble to the BS during a backoff period based, at least in part, on a type of the first random access procedure.

2. The method of claim 1, wherein determining whether to send the second random access preamble to the BS during the backoff period based on the type of the first random access procedure comprises:
determining a signal quality of one or more reference signals from the BS if the first random access procedure was initiated as a contention-free random access (CFRA) procedure.

3. The method of claim 2, further comprising:
comparing the determined signal quality to a threshold, wherein determining whether to send the second random access preamble to the BS during the backoff period is further based on the comparison.

4. The method of claim 3, wherein determining whether to send the second random access preamble to the BS during the backoff period based on the comparison comprises:
determining to send the second random access preamble if the determined signal quality satisfies the threshold.

5. The method of claim 3, wherein determining whether to send the second random access preamble to the BS during the backoff period based on the comparison comprises:
determining to wait for a next reference signal or expiry of the backoff period if the determined signal quality does not satisfy the threshold.

6. The method of claim 2, wherein determining the signal quality of one or more reference signals from the BS comprises:
waiting for the one or more reference signals and measuring the signal quality of the one or more reference signal; or
checking a most recent measured signal quality of the one or more reference signals.

7. The method of claim 1, wherein determining whether to send the second random access preamble to the BS during the backoff period based on the type of the random access procedure comprises:
determining to wait for expiry of the backoff period if the first random access procedure was initiated as a contention-based random access (CBRA) procedure.

8. The method of claim 1, further comprising transmitting the second random access preamble to the BS during the backoff period based on the determination.

9. The method of claim 1, wherein the second random access preamble is a contention-free random access (CFRA) preamble.

10. An apparatus for wireless communications, comprising:
a memory; and
at least one processor coupled with the memory and configured to:
send a first random access preamble to a base station (BS) during a first random access procedure;
receive a random access response from the BS including a backoff indicator; and
determine whether to send a second random access preamble to the BS during a backoff period based, at least in part, on a type of the first random access procedure.

11. The apparatus of claim 10, wherein the at least one processor is configured to determine whether to send the second random access preamble to the BS during the backoff period based on the type of the first random access procedure by:
determining a signal quality of one or more reference signals from the BS if the first random access procedure was initiated as a contention-free random access (CFRA) procedure.

12. The apparatus of claim 11, wherein the at least one processor is further configured to:
compare the determined signal quality to a threshold, and
determine whether to send the second random access preamble to the BS during the backoff period further based on the comparison.

13. The apparatus of claim 12, wherein the at least one processor is configured to determine whether to send the second random access preamble to the BS during the backoff period based on the comparison by:
determining to send the second random access preamble if the determined signal quality satisfies the threshold.

14. The apparatus of claim 12, wherein the at least one processor is configured to determine whether to send the second random access preamble to the BS during the backoff period based on the comparison by:
determining to wait for a next reference signal or expiry of the backoff period if the determined signal quality does not satisfy the threshold.

15. The apparatus of claim 11, wherein the at least one processor is configured to determine the signal quality of one or more reference signals from the BS by:
waiting for the one or more reference signals and measuring the signal quality of the one or more reference signal; or
checking a most recent measured signal quality of the one or more reference signals.

16. The apparatus of claim 10, wherein the at least one processor is configured to determine whether to send the second random access preamble to the BS during the backoff period based on the type of the random access procedure by:
determining to wait for expiry of the backoff period if the first random access procedure was initiated as a contention-based random access (CBRA) procedure.

17. The apparatus of claim 10, wherein the at least one processor is configured to transmit the second random access preamble to the BS during the backoff period based on the determination.

18. The apparatus of claim 10, wherein the second random access preamble is a contention-free random access (CFRA) preamble.

19. A method for wireless communications by a base station (BS), comprising:
receiving a first random access preamble from a user equipment (UE) during a first random access procedure;
sending a random access response to the UE including a backoff indicator; and
receiving a second random access preamble from the UE during a backoff period wherein the receiving is based, at least in part, on a type of the first random access procedure.

20. An apparatus for wireless communications, comprising:
a memory; and
at least one processor coupled with the memory and configured to:
receive a first random access preamble from a user equipment (UE) during a first random access procedure;

send a random access response to the UE including a backoff indicator; and receive a second random access preamble from the UE during a backoff period wherein the receiving is based, at least in part, on a type of the first random access procedure.

\* \* \* \* \*